United States Patent [19]
Holwadel

[11] Patent Number: 5,548,917
[45] Date of Patent: Aug. 27, 1996

[54] LOBSTER PROD WITH LEGAL SIZE GAUGE

[76] Inventor: David L. Holwadel, 2434 Taft St., Hollywood, Fla. 33020

[21] Appl. No.: 406,488

[22] Filed: Mar. 20, 1995

[51] Int. Cl.$^6$ .......................... A01K 61/00; A01K 80/00
[52] U.S. Cl. .................... 43/1; 33/511; D22/199
[58] Field of Search .................. 43/1, 4, 5; 294/26; 33/483, 549, 511, 484; D22/199; D10/70, 71

[56] References Cited

U.S. PATENT DOCUMENTS

| | | | |
|---|---|---|---|
| D. 265,177 | 6/1982 | Skinner | D10/71 X |
| D. 363,246 | 10/1995 | Angles | D10/70 X |
| 1,308,654 | 7/1919 | Bopst | 33/484 |
| 1,474,804 | 11/1923 | Tyrrell | 33/511 X |
| 2,645,019 | 7/1953 | Jones | 33/483 |
| 2,765,535 | 10/1956 | Weber | 43/11 X |
| 3,803,742 | 4/1974 | Foster | 43/4 |
| 5,228,226 | 7/1993 | Porosky | 43/5 |
| 5,294,021 | 3/1994 | Ducker | 222/3 |

FOREIGN PATENT DOCUMENTS

| | | | |
|---|---|---|---|
| 2510740 | 2/1983 | France | 43/1 |

Primary Examiner—Jeanne M. Elpel
Attorney, Agent, or Firm—Alvin S. Blum

[57] ABSTRACT

A prod or teaser or tickle stick used by a diver to urge a lobster from a hole includes an elongate, small diameter distal end for probing in the holes. The proximal, or handle end, includes a portion with a density less than that of sea water. The overall density is greater than that of sea water. When the device is dropped, it will fall to the bottom and not drift off. The handle end will be upright, off the bottom. It can be easily seen above the bottom growth and retrieved. Along the side of the device is a gauge including a recess for receiving the carapace of a lobster that is not of legal size. This takes the place of a separate gauge and is safer and easier to use while also holding the lobster in a net.

16 Claims, 1 Drawing Sheet

LOBSTER PROD WITH LEGAL SIZE GAUGE

BACKGROUND OF THE INVENTION

This invention relates to divers' lobster fishing apparatus and more particularly to a tickle stick for urging lobsters from their holes in combination with a gauge for determining if the lobster is of legal size.

Sport fishing for lobsters by divers is closely regulated by the government. Divers may not hook, spear or kill a lobster in the water. This is so that undersized lobsters may be released without harm. Lobsters must be measured and released in the water. Taking a lobster out of the water before measuring is an act punishable by a considerable fine.

Spiney lobsters spend most of their time when not feeding backed into holes and recesses in the rocks. They are safe from predators because only their spiney antennae and their eyes on stalks protrude. If a diver grasps the antennae and tries to pull the lobster out of the hole, it bends its tail to wedge its body in the hole. The antennae will generally break off without pulling the lobster out. It is permitted to prod or urge the lobster out of its hole by the use of a non-injurious stick, commonly called a tickle stick. Some people think the lobster moves out because it feels it is being challenged by another lobster invading its territory. When it moves out of its hole, the diver quickly scoops it up in a hand held net.

The diver must then measure the size of the violently moving lobster while keeping it in the net. In Florida, the rigid forward body, or carapace, must measure at least three inches in length. If it is less, the lobster must be released, unharmed, while underwater. A separate gauge is used for this measurement.

With only two hands and a spiney, erratically moving, lobster in a net trying to escape through the large net opening, it is difficult to hold the stick, hold the net closed, and position the gauge correctly without getting cut by the spines or losing the lobster. One often drops either the gauge or the stick during the process.

SUMMARY OF THE INVENTION

It is accordingly an object of the invention to provide a lobster gauge that is easier to carry and use without injury. The lobster prod of the invention has all of the attributes of the conventional tickle sticks. In addition, it is combined with a gauge for determining if the catch is legal. The gauge, being combined with the long prod, may be remote from the hand holding it, so that when it is held against the shell, the hand will escape injury. The prod of the invention has an overall density greater than ocean water so that it will not float away in a current when released. The prod has an end portion with a density less than ocean water so that when released it will sink to the bottom with one end up. One of the problems with prior art prods is that they lay flat on the bottom when released. Because the habitat generally has a heavy bottom growth, a dropped prod is often hard to recover. With the prod of the invention, one end will be floating well above bottom where it is easily seen and grasped.

These and other objects, features and advantages of the invention will become more apparent when the detailed description is studied in conjunction with the drawings.

DETAILED DESCRIPTION OF PREFERRED EMBODIMENTS

Figure 1:
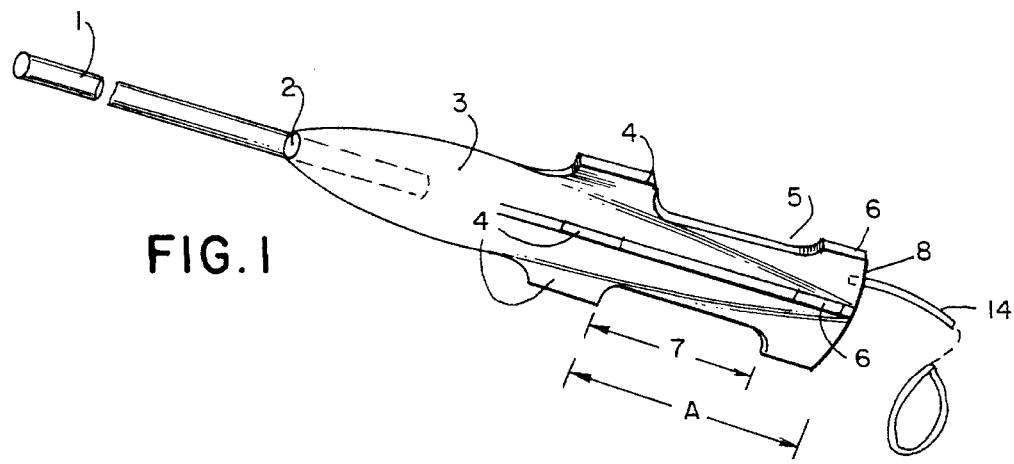
FIG. 1 is a perspective view of the stick of the invention with stick removed from handle.

In the drawings, like parts are given the same reference numeral.

Referring now first to FIG. 1, a small diameter, about ⅜ inch, rod 1, preferably about four feet in length, is fixed into the cylindrical hole 2 in handle 3. The rod has a density greater than sea water and the handle has a density less than sea water, with the overall density being greater than sea water. This enables the device to drop to the bottom with the handle pointing up four feet above the bottom where it is more readily seen and recovered. Prior art devices lie down on the bottom where they are obscured by bottom growth, or float away in the current. The handle may be hollow or formed of a low density material such as wood or foamed plastic. A looped cord or lanyard 14 may be provided for securing to the wrist to leave both hands free when required. The lobster gauge 5 is molded into the handle. It takes the form of a plurality of distal projections 4 and proximal projections 6 spaced apart to provide a gap 7 that is at least three inches long. The gauge is held against the lobster carapace. If the carapace fits within the gap, it must be released. Generally the gap is made slightly greater than three inches to allow for some error in measurement. The proximal end of the handle 8 may be spaced apart from the distal projection a distance corresponding to another legality measurement, such as the tail length of five and one-half inches shown here for example at A. There may be only one set of projections, or as many as the four sets shown here. The measuring gap extends substantially parallel to the long axis of the rod.

Figure 2:
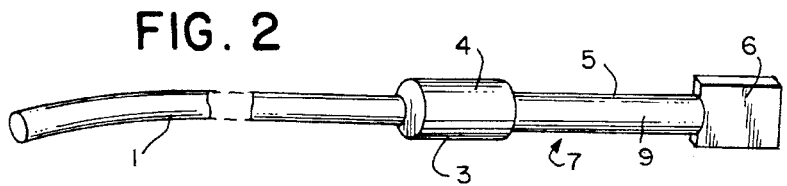
FIG. 2 is a perspective view of another embodiment of the invention.

Referring now to FIG. 2, the low density handle 3 may take the form of a cylinder with a cylindrical recess 7 comprised of a smaller diameter cylinder portion 9 intermediate one larger diameter cylinder portion 4 and a rectangular portion 6 to thereby provide the gap 7 for measurement of the carapace therein.

Figure 3:
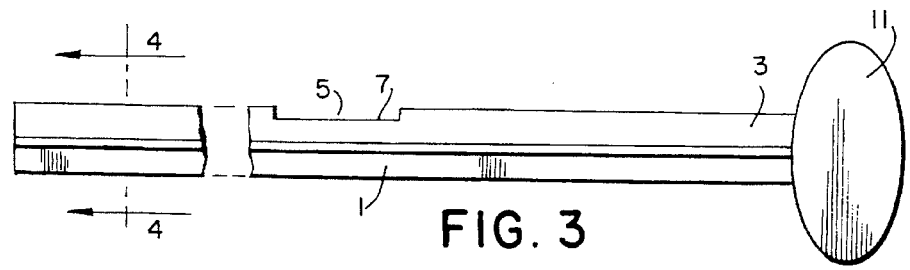
FIG. 3 is a side elevation view of another embodiment of the invention.
Figure 4:
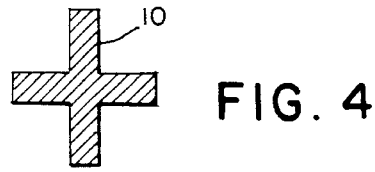
FIG. 4 is a sectional view taken through line 4—4 of FIG. 3.

Referring now to the embodiment shown in FIGS. 3 and 4, the teaser or tickle stick has an elongate rod 1 which has a cruciate small cross section 10 to provide rigidity with less weight and cost. A recess 7 in one arm is provided for the measurement. The arrangement has the advantage that there are no projections that can catch in the net during the hectic measurement process. A hollow or foam ball 11 is provided at the handle 3 to float and prevent the stick from slipping from the grasp.

Figure 5:
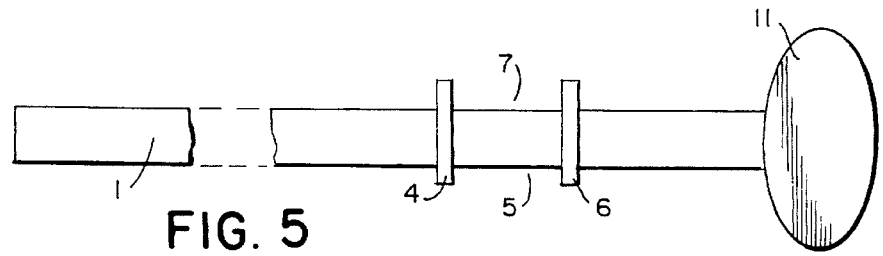
FIG. 5 is another embodiment of the invention shown in side elevation.

Referring now to FIG. 5, the distal projection and the proximal projection are provided by annular washer-like members 4,6 permanently fixed to the rod 1, these encircle the rod forming the recess 7 therebetween.

Figure 6:
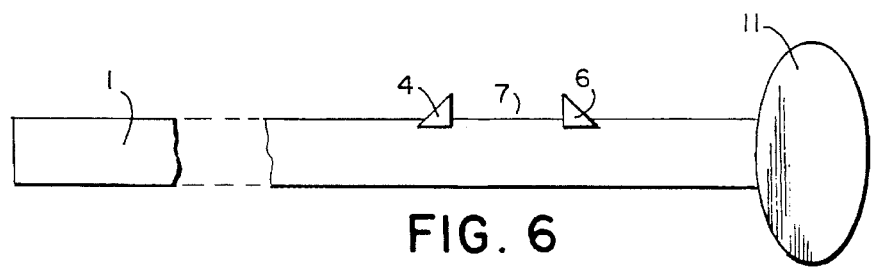
FIG. 6 is another embodiment of the invention shown in side elevation.

Referring now to FIG. 6, the proximal projection 6 and the distal projection 4 are attached to the rod and extend out from the rod 1 at only one side, and they are sloped away from the gap so as to reduce the chances of catching in the net.

A gap or recess is preferred for use as a gauge since it may be applied by touch. Simple markings that must be used visually are less desirable because visibility is often poor and the animal is moving erratically.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A lobster fishing and measuring device comprising:
   (A) an elongate, small-cross section rod member having a long axis, a proximal end and a distal end, said distal end adapted for insertion into a hole to urge a lobster therefrom, said distal end having a density greater than sea water;
   (B) a handle portion attached to said proximal end, said handle portion having a density less than that of sea water;
   (C) a gauge for measuring a part of said lobster's anatomy, said gauge defining an elongate recess extending along said long axis, said recess having a length corresponding to a fixed, regulation size limit of said part and
   (D) said device having an overall density greater than that of sea water, wherein the device will fall to the bottom when released and will rest with the handle end upstanding for enhanced retrieval.

2. The device according to claim 1, further comprising an attached wrist strap or cord.

3. The device according to claim 1, in which said gauge is formed by a pair of spaced apart projections extending radially outward from said rod member.

4. The device according to claim 3, in which said projections extend outwardly from one side of said rod member.

5. The device according to claim 3, in which said projections are annular.

6. The device according to claim 1, in which said gauge is formed by a plurality of pairs of spaced apart projections extending radially outward therefrom.

7. The device according to claim 1, in which said rod member has a non circular cross section for enhanced rigidity.

8. The device according to claim 7, in which said section is formed by intersecting arms, and said recess is formed in at least one of said arms.

9. A lobster fishing and measuring device comprising:
   an elongate, small-cross section rod member having a long axis, a proximal end and an unobstructed distal end, said distal end adapted for insertion into a hole to urge a lobster therefrom; and
   a gauge affixed to said proximal end for measuring a part of said lobster's anatomy, said gauge defining an elongate recess extending along said long axis, said recess having a length corresponding to a fixed regulation size limit of said part, said long axis exceeding the length of said recess by a factor of at least two.

10. The device according to claim 9, further comprising an attached wrist strap or cord.

11. The device according to claim 9, in which said gauge is formed by a pair of spaced apart projections extending radially outward from said rod member.

12. The device according to claim 11, in which said projections extend outwardly from one side of said rod member.

13. The device according to claim 11, in which said projections are annular.

14. The device according to claim 9, in which said gauge is formed by a plurality of pairs of spaced apart projections extending radially outward therefrom.

15. The device according to claim 9, in which said rod member has a non circular transverse section for enhanced rigidity.

16. The device according to claim 15, in which said section is formed by intersecting arms, and said recess is formed in at least one of said arms.

* * * * *